US011421141B2

(12) United States Patent
Almohsin et al.

(10) Patent No.: US 11,421,141 B2
(45) Date of Patent: *Aug. 23, 2022

(54) NANOSHEET POLYMER COMPOSITE FOR WATER SHUTOFF

(71) Applicants: Saudi Arabian Oil Company, Dhahran (SA); Alfaisal University, Riyadh (SA)

(72) Inventors: Ayman Almohsin, Doha (SA); Edreese Alsharaeh, Riyadh (SA); Feven Mattews Michael, Riyadh (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,323

(22) Filed: Apr. 21, 2020

(65) Prior Publication Data
US 2021/0324257 A1 Oct. 21, 2021

(51) Int. Cl.
*C09K 8/512* (2006.01)
*C09K 8/03* (2006.01)
*C09K 8/035* (2006.01)
*C09K 8/516* (2006.01)

(52) U.S. Cl.
CPC .............. *C09K 8/512* (2013.01); *C09K 8/032* (2013.01); *C09K 8/035* (2013.01); *C09K 8/516* (2013.01)

(58) Field of Classification Search
CPC ........ C09K 8/512; C09K 8/035; C09K 8/516; C09K 8/032
See application file for complete search history.

(56) References Cited

U.S. PATENT DOCUMENTS

| 5,465,792 | A | 11/1995 | Dawson et al. | |
| 8,557,916 | B1 | 10/2013 | Alsharaeh et al. | |
| 2016/0340570 | A1 | 11/2016 | Salla et al. | |
| 2016/0347985 | A1* | 12/2016 | Li | C09K 8/508 |
| 2017/0044687 | A1 | 2/2017 | Xu et al. | |
| 2019/0112468 | A1* | 4/2019 | Almohsin | C08K 3/04 |
| 2019/0249068 | A1* | 8/2019 | Zhao | C09K 8/516 |

FOREIGN PATENT DOCUMENTS

| CN | 104558323 | * | 4/2015 |
| CN | 104710584 | * | 6/2015 |
| CN | 107814869 | A | 3/2018 |
| CN | 110982011 | A | 4/2020 |
| WO | 2019222034 | A1 | 11/2019 |
| WO | 2021040758 | A1 | 3/2021 |
| WO | 2021216134 | A1 | 10/2021 |

OTHER PUBLICATIONS

NatureProfolio (https://www.nature.com/subjects/gels-and-hydrogels downloaded on Aug. 10, 2021).*

Katsnelson (M.I. Katsnelson, Graphene: Carbon in two dimensions, Materialstoday, 2007, 10, 20-27).*
Jiang (H. Jiang et al, Room-temperature self-healing tough nanocomposite hydrogel crosslinked by zirconium hydroxide nanoparticles, Composites Science and Technology 2017, 140, 54-62).*
International Search Report and Written Opinion dated Feb. 10, 2021 pertaining to International application No. PCT/US2020/055339 filed Oct. 13, 2020, 15 pgs.
Liu, Ruiqiong et al. "Tough and highly stretchable graphene oxide/polyacrylamide nanocomposite hydrogels", Journal of Materials Chemistry, vol. 22, No. 28, Jan. 1, 2012, pp. 14160-14167.
International Search Report and Written Opinion dated Apr. 23, 2021 pertaining to International application No. PCT/US2020/066636 filed Dec. 22, 2020, 16 pgs.
Michael, F. M. et al. "Zirconia/graphene nanocomposites effect on the enhancement of thermo-mechanical stability of polymer hydrogels", Materials Today Communications, [Online] vol. 21, Dec. 1, 2019, p. 100701.
International Search Report and Written Opinion dated Jan. 29, 2021 pertaining to International application No. PCT/US2020/055337 filed Oct. 13, 2020, 17 pgs.
Almoshin et al., "A Novel Polymer Nanocomposite Graphene Based Gel for High Temperature Water Shutoff Applications", Society of Petroleum Engineers, SPE-192358-MS, 18 pgs, Apr. 2018.
Al-Muntasheri et al., "Investigation of a High Temperature Organic Water Shutoff Gel: Reaction Mechanisms", Society of Petroleum Engineers,SPE 97530, 9 pgs. Dec. 5-6, 2005.
Al-Muntasheri et al., "A Study of Polyacrylamide-Based Gels Crosslinked with Polyethyleneimine", Society of Petroleum Engineers, SPE Journal, pp. 245-251, Jun. 2009.
Alsharaeh et al., "Evaluation of Nanomechanical Properties of (Styrene-Methyl Methacrylate) Copolymer Composites Containing Graphene Sheets", American Chemical Society, vol. 52, pp. 17871-17881, Nov. 27, 2013.
Alsharaeh et al., "Microwave Irradiation Effect on the Dispersion and Thermal Stability of RGO Nanosheets within a Polystyrene Matrix", Materials, vol. 7, pp. 5212-5224, Jul. 18, 2014.

(Continued)

*Primary Examiner* — Kumar R Bhushan
(74) *Attorney, Agent, or Firm* — Dinsmore & Shohl LLP

(57) ABSTRACT

A polymer composite hydrogel includes a polymer composite, water, an organic crosslinker, and a salt. The polymer composite includes a nanosheet filler dispersed throughout a polymerized polyacrylamide. The nanosheet filler includes one or more of zirconium hydroxide, zirconium oxide, titanium oxide, graphene oxide, non-functionalized graphene, and hexagonal boron nitride. Further, a weight ratio of the nanosheet filler to the polymerized polyacrylamide is between 1:99 and 1:9. The polymer composite hydrogel includes 0.5 to 6 weight percent of the polymer composite and 0.25 to 5 weight percent of the salt, the salt being a monovalent salt, a divalent salt, or a combination of monovalent and divalent salts. A method of preparing a polymer composite, a method of preparing a polymer composite hydrogel for water shutoff applications, and the associated method of forming a barrier to shut off or reduce unwanted production of water in a subterranean formation is also provided.

14 Claims, 9 Drawing Sheets

(56) References Cited

OTHER PUBLICATIONS

Donovan et al., "Delaying Gelation of Aqueous Polymers at Elevated Temperatures Using Novel Organic Crosslinkers", Society of Petroleum Engineers, SPE 37246, pp. 361-371, Feb. 18-21, 1997.
Fathima et al., "Polymer Nanocomposites for water shutoff application—A review", Matter Res. Express, vol. 6, 18 pgs., 2019.
Taha et al., "Nano Graphene Application Improving Drilling Fluids Performance", International Petroleum Technology Conference, IPTC-18539-MS, 16 pgs., Dec. 6-9, 2015.
Tongwa et al., "Evaluation of a Nanocomposite Hydrogel for Water Shut-Off in Enhanced Oil Recovery Applications: Design, Synthesis, and Characterization", Journal of Applied Polymer Science, 8 pgs, Jun. 15, 2012.
Zolfaghari et al., "Preparation and Characterization of Nanocomposite Hydrogels Based on Polyacrylamide for Enhanced Oil Recovery Applications", Journal of Applied Polymer Science, vol. 100, pp. 2096-2103, 2006.
U.S. Notice of Allowance and Fee(s) Due dated Dec. 10, 2021 pertaining to U.S. Appl. No. 16/854,299, filed Apr. 21, 2020, 38 pages.
International Search Report and Written Opinion dated Feb. 22, 2022 pertaining to International application No. PCT/US2021/053689 filed Oct. 6, 2021, 16 pages.
U.S. Notice of Allowance and Fee(s) Due dated Oct. 21, 2021 pertaining to U.S. Appl. No. 16/854,274, filed Apr. 21, 2020, 30 pages.

* cited by examiner

NANOSHEET POLYMER COMPOSITE FOR WATER SHUTOFF

TECHNICAL FIELD

The present disclosure relates to natural resource well drilling and hydrocarbon production from subterranean formations and, more specifically, to a nanosheet based polymer composite for eliminating or reducing water production in a hydrocarbon wellbore.

BACKGROUND

The discovery and extraction of hydrocarbons, such as oil or natural gas, from subterranean formations may be impeded for a variety of reasons, such as produced water in the reservoir. Specifically, produced water is a significant concern for the oil and gas industry with produced water resulting in incurred handling costs and oil recovery costs as well as affecting productivity through scale formation, corrosion of the field equipment and potential formation failure. Before discharge or reinjection, the produced water needs to be treated to meet governmental regulations and prevent environmental pollution. To overcome these issues economically, water production is minimized for water shutoff treatments applied to zones via mechanical isolation or chemical based isolation or by drilling in a manner to avoid produced water. Polymer-based products exist for water shutoff and enhanced oil recovery, yet they lack chemical and thermal stability.

SUMMARY

Accordingly, there is an ongoing need for materials for forming a barrier to shut off or reduce unwanted production of water in a subterranean formation which possess chemical and thermal stability. The present disclosure includes a polymer composite and associated polymer composite hydrogel for water shutoff. In particular, the present disclosure includes methods for preparation of polymer composite having a nanosheet filler dispersed within a polymer matrix and subsequently forming a polymer composite hydrogel for water shutoff utilizing the same as well. Combining the water reducing properties of the polymer composite hydrogel with the nanosheet fillers allows unwanted water production to be reduced, hydrocarbon outcome sustained, and overall extraction costs to be reduced.

According to one or more embodiments of the present disclosure, a polymer composite hydrogel is disclosed. The polymer composite hydrogel includes a polymer composite, water, an organic crosslinker, and a salt. Further, the polymer composite comprises a nanosheet filler dispersed throughout a polymerized polyacrylamide; the nanosheet filler comprises one or more of zirconium hydroxide, zirconium oxide, titanium oxide, graphene oxide, non-functionalized graphene, and hexagonal boron nitride; a weight ratio of the nanosheet filler to the polymerized polyacrylamide is between 1:99 and 1:9; the polymer composite hydrogel comprises 0.5 to 6 weight percent of the polymer composite; and the polymer composite hydrogel comprises 0.25 to 5 weight percent of the salt, the salt being a monovalent salt, a divalent salt, or a combination of monovalent and divalent salts.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar referenced item.

DETAILED DESCRIPTION

Figure 1:
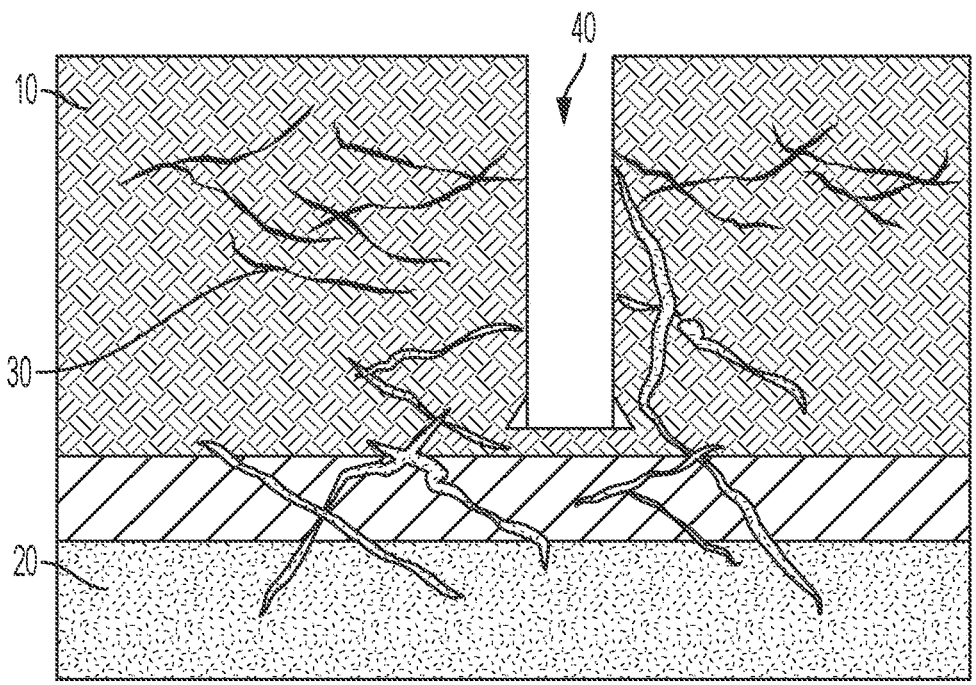
FIG. 1 is a schematic drawing of a subterranean formation showing fractures connecting a wellbore and a water bearing zone.

Reference will now be made in detail to embodiments of a polymer composite hydrogel as well as methods of preparing the same. An associated method of forming a barrier to shut off or reduce unwanted production of water in a wellbore utilizing the polymer composite hydrogel is also disclosed.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing. Coiled tubing may also be used as part of the production tubing.

The present disclosure is directed to compositions and methods for shutting off or reducing unwanted production of water within a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to the surface.

However, the wellbore may also be in fluid communication with water bearing zones within the subterranean formation. As used in the present disclosure, the term "water bearing zones" may refers to the regions of the subterranean formation having water that occurs naturally within the pores of rock. The fractures within the subterranean formation which allows for hydrocarbons to flow to the wellbore also allows formation water from the water bearing zones to flow to the wellbore.

Embodiments of the present disclosure include methods of forming a barrier to shut off or reduce unwanted production of water in a subterranean formation. The method includes injecting a polymer composite hydrogel into one or more water producing fractures in the subterranean formation. In accordance with the present disclosure, the polymer composite hydrogel may be formed from a nanosheet filler dispersed within a polymer matrix, where the nanosheet filler comprises one or more of zirconium hydroxide, zirconium oxide, titanium oxide, graphene oxide, non-functionalized graphene, and hexagonal boron nitride. Further, the polymer matrix may be formed from polymerization of one or more of acrylamide, acyrlonitrile acid, vinyl alcohol, ethylene terephthalic acid, butylene terephthalic acid, ethylene, isocyanates and polyols, and propylene.

Figure 2:
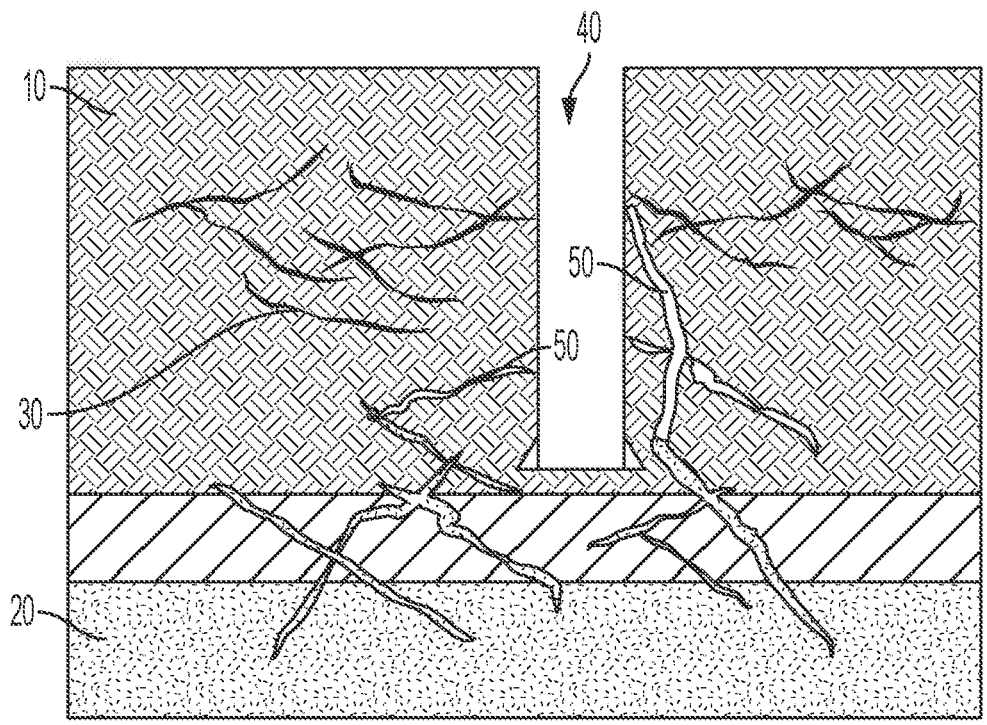
FIG. 2 is a schematic drawing of the subterranean formation of FIG. 1A with injection of the polymer composite hydrogel in accordance with one or more embodiments described in this disclosure.

With reference to FIGS. 1 and 2, a production well and associated fractures are illustrated. The subterranean formation includes a hydrocarbon bearing zone 10 and a water bearing zone 20. The hydrocarbon bearing zone 10 is characterized by the region of the subterranean formation which includes recoverable hydrocarbons within the matrix of the subterranean formation. The water bearing zone 20 is characterized by the region of the subterranean formation having water that occurs naturally within the pores of rock. Each of the hydrocarbon bearing zone 10 and the water bearing zone 20 are interlaced with fractures 30 which facilitate flow of hydrocarbons, formation water, or both through the subterranean formation. To recover the hydrocarbons within the subterranean formation, a wellbore 40 is provided within the subterranean formation in fluid communication with the fractures 30.

The water bearing zone 20 of the subterranean formation may be sequestered from the wellbore 40 by introduction of the polymer composite hydrogel 50 into water producing fractures in the subterranean formation. It will be appreciated that the water producing fractures are the fractures 30 which are in fluid communication with the water bearing zone 20 and the wellbore 40 thus are capable of flowing formation water from the water bearing zone 20 to the wellbore 40. FIG. 1 provides an illustration of the subterranean formation prior to treatment in accordance with methods of the present disclosure and FIG. 2 provides an illustration of the water producing fractures obstructed with the polymer composite hydrogel 50.

It will be appreciated that the fractures 30 interlaced throughout the subterranean formation may be naturally occurring or induced with enhanced oil recovery techniques such as fracturing operations. The methods for shutting off or reducing unwanted production of water in the subterranean formation with the polymer-sand nanocomposite of the present disclosure may be applied to all fractures 30 regardless of whether they are naturally occurring or induced with enhanced oil recovery techniques.

Forming a barrier to shut off or reduce unwanted production of water in a subterranean formation involves injecting a polymer composite hydrogel 50 in accordance with the present disclosure into one or more water producing fractures in the subterranean formation. It will be appreciated that the polymer composite hydrogel 50 may be injected into the water producing fractures in accordance with methods and techniques familiar to those skilled in the art for placement of drilling or treatment fluids within the fractures of a subterranean formation. In one or more embodiments, the polymer composite hydrogel 50 may be injected into the water producing fractures via coiled tubing or production tubing placed downhole. The polymer composite hydrogel 50 may further be directed to the fractures desired for treatment with the placement of bridge plugs or other devices to direct or obstruct flow.

Having described utilization of the polymer composite hydrogel 50 for water shutoff applications, methods of preparing a polymer composite hydrogel 50 and the polymer composite utilized in the production of the polymer composite hydrogel 50 will be disclosed in detail. The polymer composite comprises a nanosheet filler dispersed within a polymer matrix. The polymer composite is described in further detail supra.

The polymer composite hydrogel 50 is formed by combining the polymer composite with water to form an aqueous solution having at least 0.5 weight percent (wt. %) polymer composite, adding an organic cross-linker and a salt to the aqueous solution to form a hydrogel precursor solution, and heating the hydrogel precursor solution to gel the hydrogel precursor solution.

An aqueous solution is formed by dissolving the polymer composite in water. It will be appreciated that when the polymer composite is dissolved in water, the polymer chains of the polymer composite are hydrated. In one or more embodiments, the aqueous solution is formed by combining the polymer composite with water to form an aqueous solution having at least 0.5 wt. % polymer composite. In various further embodiments, the aqueous solution may comprise at least 1 wt. % of the polymer composite, at least 2 wt. % of the polymer composite, 0.5 to 6 wt. % of the polymer composite, 0.5 to 4 wt. % of the polymer composite, or 2 to 4 wt. % of the polymer composite. It will be appreciated that the polymer composite reinforces the thermal and mechanical properties of the resulting gel through the enhanced interactions between the gel and the polymer composite and their weight percentages have been optimized for the maximum stabilities of the gels.

In one or more embodiments, the aqueous solution is prepared by mechanically mixing the polymer composite and water. In one or more embodiments, the mechanical mixing comprises a magnetic stirrer. However, it will be appreciated by one skilled in the art that an alternative mechanical mixing means could be utilized to achieve the same effect of dissolving the polymer composite in the water. In various embodiments, the mechanical mixing may be maintained for at least 15 minutes, at least 30 minutes, at least 1 hour, or 15 minutes to 3 hours.

In one or more embodiments, the water used to form the aqueous solution with the polymer composite may be deionized water. It will be appreciated that if deionized water is not used, the subsequent gelation reaction may be randomly affected by the presence of unknown ions and substances present in conventional water. For example, chloride ions (Cl—) can detrimentally affect the gelation reactions and the mechanical stability of the forming gel.

In one or more embodiments, the organic cross-linker and the salt are added to the aqueous solution formed from the previously combined water and polymer composite to form the hydrogel precursor solution. Specifically, the organic cross-linker and the salt may be added to the aqueous solution and stirred for an additional 2 to 30 minutes, 5 to 25 minutes, 10 to 20 minutes, or approximately 15 minutes with a magnetic stirrer or other mixing system known to those skilled in the art. The stirring integrates the organic cross-linker and dissolves the salt into the aqueous solution.

An organic cross-linker is provided to increase the viscosity of the gelling agents by connecting the separate gel polymers together. In various embodiments, the organic cross-linker is a mixture of hydroquinone (HQ) and hexamethylenetetramine (HMT), phenol/formaldehyde, polyethylenimine (PEI), acetylsalicylic acid (ASA), catechol, resorcinol, or N,N'-methylenebisacrylamide (NBAM). In one or more specific embodiments, the organic cross-linker is a mixture of HQ and HMT. In various embodiments, the organic cross-linker may be added to comprise 0.1 to 1 wt. % of the hydrogel precursor solution, 0.1 to 0.5 wt. % of the hydrogel precursor solution, or 0.1 to 0.3 wt. % of the hydrogel precursor solution.

In various embodiments, the salt is a monovalent salt, a divalent salt, or a combination of monovalent and divalent salts. For example, the salt may be one or more of KCl, $MgCl_2$, $CaCl_2$), or NaCl. The salt may also be provided in the form of Arabian seawater. The salt may be added to comprise 0.25 to 5 wt. % of the hydrogel precursor solution. The weight percentage of salt may vary depending on reservoir conditions with consideration of the natural salinity of the ground water in the reservoir.

In one or more embodiments, the hydrogel precursor solution may be flushed with nitrogen to remove dissolved oxygen from in the hydrogel precursor solution. In various embodiments, the nitrogen flush may be continued for 15 seconds to 3 minutes, 20 seconds to 2 minutes, or 30 seconds to 1 minute. It will be appreciated that if the duration of the flush is too brief the dissolved oxygen may not be completely removed from the hydrogel precursor solution. Similarly, an extended duration of the nitrogen flush may result in a waste of time and energy.

The hydrogel precursor solution is heated for a formation period to gel the hydrogel precursor solution and form the polymer composite hydrogel. In various embodiments, the formation period may comprise heating the hydrogel precursor solution to 150 to 175° C., 150 to 170° C., 150 to 160° C., 150 to 155° C., or approximately 150° C. for at least 8 hours, 8 to 72 hours, 24 to 60 hours, 36 to 56 hours, or approximately 48 hours.

Preparation of the polymer composite includes dispersing a nanosheet filler within a polymer matrix to form a polymer composite precursor solution comprising a polymer composite precursor within an aqueous media, quenching the polymerization reaction with the addition of a first alcohol to the polymer composite precursor solution, filtering the polymer composite precursor from the aqueous media of the polymer composite precursor solution, washing the polymer composite precursor with one or more of a second alcohol and acetone, grinding the polymer composite precursor, and drying the polymer composite precursor to form the polymer composite. The polymer composite precursor comprises the nanosheet filler dispersed in a polymer matrix of the polymerized monomer.

The nanosheet filler provides enhanced thermochemical stability to the resulting polymer composite hydrogel. In various embodiments, the nanosheet filler may comprise a particle size of 5 to 25 microns, thickness of 1 to 10 nm, a surface area of 120 to 150 $m^2/g$, a bulk density of 0.03 to 0.1 $g/cm^3$, and their combinations which may be formed by ranges capturing each discrete value encompassed by the explicitly disclosed ranges. In various embodiments, the nanosheet filler may comprise a metal oxide, a metal hydroxide, 2D fillers, composites of 2D fillers and a metal hydroxide or metal oxide, or their combinations. Example 2D fillers include graphene oxide, non-functionalized graphene, and hexagonal boron nitride. As such, in one or more embodiments, the nanosheet filler may comprise one or more of zirconium hydroxide, zirconium oxide, titanium oxide, graphene oxide, non-functionalized graphene, and hexagonal boron nitride.

Dispersing the nanosheet filler within a polymer matrix may include dissolving a monomer in water to form a first solution, dispersing the nanosheet filler in an organic solvent in the presence of an emulsifying agent to form a second solution, combining the first solution and the second solution to form an emulsion, and adding a polymerization initiator comprising a persulfate to the emulsion to initiate a polymerization reaction of the monomer to form a polymer composite precursor solution comprising a polymer composite precursor within an aqueous media. The polymer composite precursor comprises the nanosheet filler dispersed in a polymer matrix of the polymerized monomer.

Preparation of the first solution includes dissolving a monomer in water. The monomer may be selected to include a double bond which is susceptible to polymerization under photo or thermal initiation. In various embodiments, the monomer comprises one or more of acrylamide, acyrlonitrile acid, vinyl alcohol, ethylene terephthalic acid, butylene terephthalic acid, ethylene, isocyanates and polyols, and propylene. It will be appreciated that polymerization of such monomers results in a polymer matrix comprising polyacrylamide (PAM), polyacyrlonitrile (PAN), poly(vinyl alcohol) (PVA), polyethylene terephthalate (PET), polybutylene terephthalic (PBT), polyethylene (PE), polyurethane (PU), and polypropylene (PP) respectively. In one or more specific embodiments, the monomer comprises acrylamide such that polymerization of the monomer results in a polymer matrix comprising PAM.

In one or more embodiments, the first solution is prepared by dissolving the monomer in the water as a concentration of 1 wt. % to 10 wt. %. In various embodiments, the monomer may be added at 2 wt. % to 8 wt. %, 2 wt. % to 6 wt. %, 3 wt. % to 5 wt. %, or approximately 4 wt. %. Further, in one or more embodiments, the water may be deionized water. It will be appreciated that as with the formation of the aqueous solution, if deionized water is not used, the subsequent gelation reaction may be affected by the presence of unknown ions and substances present in conventional water.

Preparation of the second solution includes dispersing the nanosheet filler in an organic solvent in the presence of an emulsifying agent. Dispersion of the nanosheet filler in an organic solvent and an emulsifying agent improves the subsequent dispersion of the nanosheet filler within the polymer matrix. Additives, such as the nanosheet filler, are susceptible to aggregation when incorporated into a polymer matrix. Improving the dispersion characteristics of the nanosheet filler alleviates the aggregation and results in a more homogenous polymer composite.

The nanosheet filler may be dispersed in the organic solvent and emulsifying agent with sonication to ensure complete integration. In various embodiments, the sonication to mix the nanosheet filler, organic solvent, and emulsifying agent may be sustained for 30 minutes to 2 hours, 30 minutes to 1.5 hours, 45 minutes to 1.25 hours, or approximately 1 hour.

In various embodiments, the organic solvent is selected from hexane, cyclohexane, heptane, cycloheptane, toluene, and 1,2-Dichlorobenzene.

In various embodiments, the emulsifier agent comprises polysorbate 60, polysorbate 80, sorbitane monostearate, sorbitane monooleate, or sodium dodecyl sulfate. It will be appreciated that polysorbate 60 is alternatively known as polyoxyethylene glycol sorbitan monostearate and is commercially available as TWEEN 60 from Croda International PLC. Similarly, polysorbate 80 is alternatively known as polyoxyethylene glycol sorbitan monooleate and is commercially available as TWEEN 60 from Croda International PLC. Further, sorbitane monostearate and sorbitane monooleate are commercially available as SPAN 60 and SPAN 80 respectively from Croda International PLC.

In one or more embodiments, the organic solvent comprises cyclohexane and the emulsifier agent comprises polysorbate 60 or polysorbate 80 in combination with sorbitane monostearate or sorbitane monooleate. In various embodiments, the emulsifier agent is provided as a 10:1 to 1:1, 6:1 to 2:1, or approximately 3:1 ratio of sorbitane monostearate or sorbitane monooleate to polysorbate 60 or polysorbate 80.

The first solution and the second solution may be combined to form an emulsion. In various embodiments, the first solution and the second solution may be combined to form an emulsion having a weight ratio of nanosheet filler to monomer between 1:99 and 1:9, between 1:49 and 1:19, between 1:99 and 1:25, approximately 1:49, or approximately 1:19.

The emulsion formed from the first and second solution may be formed by homogenization of the first and second solution. In one or more embodiments, the first solution and the second solution may be mixed with a homogenizer for a period of time and at a temperature sufficient to form the emulsion. For example, the homogenizer may mix the first solution and the second solution for a period of 30 minutes to 1 hour, 30 minutes to 45 minutes, 30 minutes to 40 minutes, or approximately 30 minutes at a temperature of 0° C. to 12° C., 2° C. to 12° C., 6° C. to 12° C., or approximately 10° C.

In one or more embodiments, the emulsion of the first solution and the second solution may be purged with nitrogen gas. In various embodiments the emulsion may be purged with nitrogen gas for 1 to 15 minutes, 2 to 10 minutes, 3 to 6 minutes, or approximately 5 minutes.

A polymerization initiator comprising a persulfate may be added to the emulsion to initiate a polymerization reaction of the monomer and form the polymer composite precursor solution. The polymerization initiator acts to initiate the free radical polymerization of the monomer. In various embodiments, the polymerization initiator comprises ammonium persulfate (APS) or potassium persulfate (KPS). In one or more specific embodiments, the polymerization initiator comprises APS.

In one or more embodiments, a polymerization catalyst is introduced into the emulsion in combination with the polymerization initiator. The polymerization catalyst serves to catalyze the polymerization process of the monomer resulting in quicker, more complete, or quicker and more complete polymerization of the monomer. In various embodiments, the polymerization catalyst comprises tetramethylenediamine, ascorbic acid, ferrous sulfate, or hydrogen peroxide. In one or more specific embodiments, the polymerization catalyst comprises tetramethylenediamine.

The polymerization initiator, the polymerization catalyst, or both may be mixed into the emulsion with heating. The temperature increase results in the polymerization initiator dissociating to form free radical which in turn initiates the polymerization process of the monomer. Specifically, in various embodiments, the emulsion may be heated to at least 40° C., 40° C. to 60° C., or approximately 50° C. during introduction of the polymerization initiator, the polymerization catalyst, or both. In one or more embodiments, the polymerization initiator may be added to the emulsion such that the polymerization initiator is provided at a 1:99 to 1:9 ratio by weight of polymerization initiator to monomer. In one or more embodiments, the polymerization catalyst may be added to the emulsion such that the polymerization catalyst is provided at a 1:10 to 1:50 ratio by weight of polymerization catalyst to polymerization ratio. It will be appreciated that in one or more embodiments, the polymerization initiator is provided at a 1:99 to 1:9 ratio by weight of polymerization initiator to monomer and the polymerization catalyst is provided at a 1:10 to 1:50 ratio by weight of polymerization catalyst to polymerization ratio.

The polymerization reaction of the monomer may be quenched with the addition of a first alcohol to the polymer composite precursor solution. In various embodiments, the first alcohol is added to the polymer composite precursor solution to quench the polymerization reaction 1 to 6 hours, 2 to 5 hours, or approximately 3 hours after addition of the polymerization initiator. Without wishing to be bound by theory, it will be appreciated that based on the quantitative measures of monomer, polymerization initiator, and polymerization catalyst provided it can be inferred that the polymerization is expected to be fully complete in 3 hours. As such, quenching can be commenced once the calculated timespan plus a measure of safety has passed.

In various embodiments, the first alcohol may be a lower aliphatic alcohol utilized as a quencher such as methanol, ethanol, iso-propanol, or propanol. In one or more specific embodiments, the first alcohol may be methanol. In one or more embodiments, the first alcohol may be added at 1 to 2 volume percent of the polymer composite precursor solution. Alternatively stated, in one or more embodiments the first alcohol may be provided at 2 to 4 wt. % of alcohol to the polymer composite precursor solution.

In one or more embodiments, the polymer composite precursor solution with the first alcohol added to quench the polymerization reaction of the monomer may be cooled to expedite termination of the polymerization reaction. For example, the vessel containing the polymer composite precursor solution may include a cooling jacket or be transferred to a cooling bath. In one or more embodiments, the polymer composite precursor solution is cooled to a temperature of 0° C. to 10° C. In various embodiments, the polymer composite precursor solution may be held in the cooling bath before filtration of the polymerized product for a period of 5 minutes to 1 hour, 5 minutes to 30 minutes, or 5 minutes to 15 minutes.

The polymer composite precursor may be isolated by filtration from the aqueous media of the polymer composite precursor solution. Filtration may be completed using any technique known to those skilled in the art for separation of a polymer from an aqueous media. For example, the polymer composite precursor solution may be passed through a filter press or undergo vacuum filtration. In various embodiments, the filtration media may have a pore size of 1.5 to 5 micrometers, 2 to 4 micrometers, or approximately 2.5 micrometers. For example, Grade 42 ashless filter paper having a pore size of 2.5 micrometers may be utilized.

The polymer composite precursor filtered from the polymer composite precursor solution may be washed with one or more of a second alcohol and acetone. In various embodiments, the second alcohol may comprise methanol, ethanol, iso-propanol, or propanol. Washing with the second alcohol or acetone purifies the polymer composite precursor and removes residual water from the aqueous media. The polymer composite precursor forms beads in the washing process of the nanosheet filler dispersed within the polymer matrix. In various embodiments, the washing process is repeated at least 1 time, at least 2 times, at least 5 times, at least 10 times, or 1 to 10 times.

The beads of the washed polymer composite precursor may be ground to form particulates of the polymer composite precursor. In various embodiments, the polymer composite precursor may be ground to an average particle size of 2 to 500 nm, 50 to 250 nm, 75 to 150 nm, or approximately 100 nm. The particle size may be quantified by measuring the longest dimension of each particulate of the polymer composite precursor using an imaging technique. For example, Scanning Electron Microscopy (SEM) images may be utilized to visually confirm the sizing of the polymer composite precursor particles. In various embodiments, the polymer composite precursor may be ground with ball milling, an industrial scale blender, a rotating grinding drum, or other grinding technique known to those skilled in the art.

The particulates of the polymer composite precursor may be dried to form the polymer composite. Specifically, in one or more embodiments, the polymer composite precursor may be dried to a moisture level less than 1 wt % to form the polymer composite. Various drying techniques known to those skilled in the art may be utilized which maintain the temperature of the polymer composite less than the melting point of the polymer matrix. In one or more embodiments, vacuum during drying may be utilized. In various embodiments, the vacuum drying may be completed at a temperature of 25 to 100° C., 40 to 80° C., or approximately 60° C. Further, in various embodiments, the polymer composite precursor may be dried using vacuum drying for a period of at least 6 hours, 6 to 18 hours, 10 to 14 hours, or approximately 12 hours.

It will be appreciated that the polymer composite may be prepared in accordance with the present disclosure and stored for subsequent preparation into the polymer composite hydrogel. For example, the polymer composite may be produced at a site away from the wellbore and shipped to the drilling location for preparation into the polymer composite hydrogel at the wellbore site. Such technique reduces transportation costs as the relatively lightweight and compact polymer composite is shipped and formed into the polymer composite hydrogel using water and other components already available at the wellbore site.

EXAMPLES

The following examples illustrate features of the present disclosure but are not intended to limit the scope of the disclosure.

Example polymer composite hydrogels were prepared to test and demonstrate the thermal stability and viscoelastic properties of the formed polymer composite hydrogel under reservoir temperature and conditions. Comparative Example 1 represent hydrogels formed using commercial PAM (Floline Size N, commercially available from SNF Floerger, France). Comparative Example 2 and 7 as well as Inventive Examples 3-6 and 8-12 represent hydrogels utilizing PAM synthesized using reverse emulsion polymerization using techniques discussed in the present disclosure.

Initially a polymer composite was synthesized using reverse emulsion polymerization techniques in accordance with methods described in the present disclosure. Preparation of the polymer composites for testing was carried out by first dissolving a monomer in water to form the first solution. Specifically, 4 grams of acrylamide monomer was dissolved in 14 milliliters (ml) of water. In a separate preparation vessel, nanosheet fillers at different weight concentrations were dissolved in 55 ml cyclohexane and 4 ml of emulsifier agent of span 60 or 80 and TWEEN 60 or 80 with a volume ratio of emulsifier agent to organic solvent of about 2.5:1 to prepare the second solution. The second solution was mixed using a sonication probe for 1 hour. The nanosheet filler and weight concentration of the nanosheet filler in the second solution were varied for each of the formed polymer composite hydrogels representing Comparative Examples 2 and 7 as well as Inventive Examples 3-6 and 8-12. Specifically, Comparative Examples 2 and 7 were prepared with the addition of no nanosheet filler and represent hydrogel formed with neat PAM formed using reverse emulsion polymerization techniques. Inventive Example 3 was formed with $Zr(OH)_4$ in the polymer composite at a rate representative of 2 wt. % of the acrylamide monomer. Inventive Example 4 was formed with $Zr(OH)_4$ in the polymer composite at a rate representative of 5 wt. % of the acrylamide monomer. Inventive Example 5 was formed with non-functionalized graphene in the polymer composite at a rate representative of 2 wt. % of the acrylamide monomer. Inventive Example 6 was formed with hexagonal boron nitride in the polymer composite at a rate representative of 2 wt. % of the acrylamide monomer. Inventive Examples 8 through 12 were also each formed with non-functionalized graphene in the polymer composite at a rate representative of 2 wt. % of the acrylamide monomer. The weight concentration of the nanosheet fillers in each Example is provided in Table 1.

To form the emulsion, the first solution and the second were mixed with a homogenizer for 30 minutes at 10° C. The resulting emulsion was then purged by nitrogen gas for 5 minutes. Temperature and stirrer speed was set at 50° C. and 400 rpm, respectively. Subsequently, 25 microliters (μL) of TEMED and APS solution prepared with 0.1 grams (g) APS dissolved in 1 mL of distilled water were charged into the emulsion to form the polymer composite precursor solution. After 3 hours, the polymerization reaction was quenched with the addition of a few drops of methanol and the resulting solution was left in a cooling bath. Afterwards, the polymer composite precursor was isolated by filtration and washed several times by acetone. Beads of precipitates were then ground by blender and dried under vacuum at 60° C. for 12 hours to form the polymer composite.

The Example polymer composite hydrogels were then prepared by dissolving each of the various polymer composite powders in 5 ml of deionized water for 1 hour using magnetic stirring. The weight percentage of the neat PAM polymer were varied for each of the formed hydrogels representing Comparative Examples 1-2 and 7. Similarly, the weight percentage of the polymer composite were varied for each of the formed polymer composite hydrogels representing Inventive Examples 3-6 and 8-12. Specifically, Comparative Examples 1-2 were prepared with the neat PAM polymer comprising 2 wt. % of the formed hydrogel and Comparative Example 7 was prepared with the neat PAM polymer comprising 4 wt. % of the formed hydrogel. Inventive Example 3-6 were each formed with the polymer composite comprising 2 wt. % of the formed polymer composite hydrogels. Inventive Example 8-12 were each formed with the polymer composite comprising 4 wt. % of the formed polymer composite hydrogels. The weight percentage of the polymer composite in each polymer composite hydrogel in each Example is provided in Table 1.

Then, HQ and HMT were added in 1:1 weight ratio with 15 milligrams (mg) of each in combination with 100 mg of KCl salt into the solution while stirring. After 15 minutes, the prepared solution was collected in a glass vial and flushed with nitrogen before placing in the oven for 48 hours at 150° C.

TABLE 1

Hydrogel Composition

| Example | Polymer | Polymer Composite in Hydrogel | Nanosheet Filler in Polymer Composite | Crosslinker in Hydrogel | Salt in Hydrogel |
| --- | --- | --- | --- | --- | --- |
| Comparative Example 1 | PAM (commercial) | 2 wt. % (neat PAM) | — | 0.3 wt. % | 2 wt. % KCl |
| Comparative Example 2 | PAM (emulsion) | 2 wt. % (neat PAM) | — | 0.3 wt. % | 2 wt. % KCl |
| Inventive Example 3 | PAM (emulsion) | 2 wt. % | 2 wt. % $Zr(OH)_4$ | 0.3 wt. % | 2 wt. % KCl |
| Inventive Example 4 | PAM (emulsion) | 2 wt. % | 5 wt. % $Zr(OH)_4$ | 0.3 wt. % | 2 wt. % KCl |
| Inventive Example 5 | PAM (emulsion) | 2 wt. % | 2 wt. % graphene | 0.3 wt. % | 2 wt. % KCl |
| Inventive Example 6 | PAM (emulsion) | 2 wt. % | 2 wt. % boron nitride | 0.3 wt. % | 2 wt. % KCl |
| Comparative Example 7 | PAM (emulsion) | 4 wt. % (neat PAM) | — | 0.3 wt. % | 2 wt. % KCl |
| Inventive Example 8 | PAM (emulsion) | 4 wt. % | 2 wt. % graphene | 0.3 wt. % | 2 wt. % KCl |
| Inventive Example 9 | PAM (emulsion) | 4 wt. % | 2 wt. % graphene | 0.15 wt. % | 2 wt. % KCl |
| Inventive Example 10 | PAM (emulsion) | 4 wt. % | 2 wt. % graphene | 0.3 wt. % | 2 wt. % $MgCl_2$ |
| Inventive Example 11 | PAM (emulsion) | 4 wt. % | 2 wt. % graphene | 0.3 wt. % | Arabian Seawater |
| Inventive Example 12 | PAM (emulsion) | 4 wt. % | 2 wt. % graphene | 0.3 wt. % | 2 wt. % KCl |

Figure 3A:
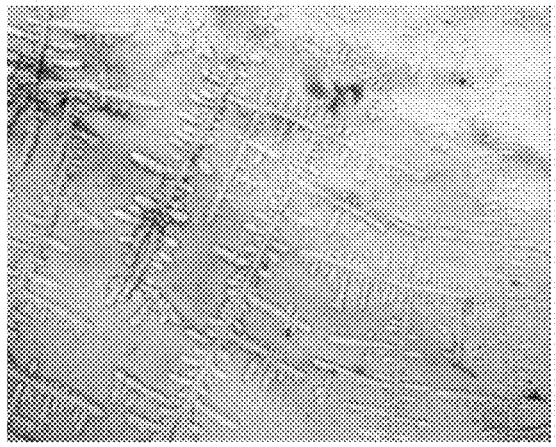
FIG. 3A is an optical microscope image of hydrogel utilizing neat polyacrylamide (PAM) synthesized using reverse emulsion polymerization in accordance with techniques of the present disclosure.
Figure 3B:
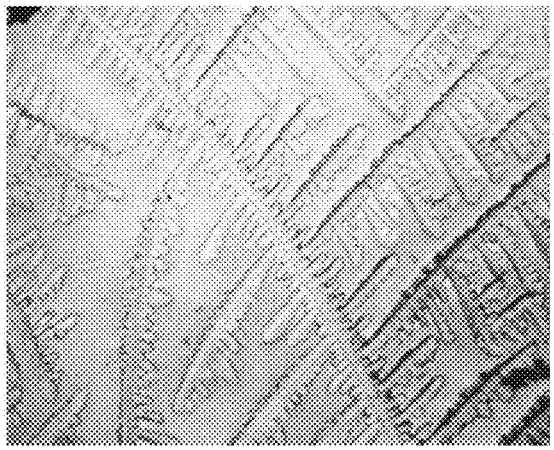
FIG. 3B is an optical microscope image of a hydrogel utilizing PAM synthesized using reverse emulsion polymerization with $Zr(OH)_4$ as the nanosheet filler in accordance with one or more embodiments of the present disclosure.
Figure 3C:
FIG. 3C is an optical microscope image of a hydrogel utilizing PAM synthesized using reverse emulsion polymerization with non-functionalized graphene as the nanosheet filler in accordance with one or more embodiments of the present disclosure.
Figure 3D:
FIG. 3D is an optical microscope image of a hydrogel utilizing PAM synthesized using reverse emulsion polymerization with hexagonal boron nitride as the nanosheet filler in accordance with one or more embodiments of the present disclosure.

With reference to FIGS. 3A-3D, optical microscope images of emulsion prepared PAM composite hydrogels with and without fillers are illustrated. Specifically, FIG. 3A illustrates Comparative Example 2 representing hydrogel prepare utilizing neat PAM synthesized using reverse emulsion polymerization. FIG. 3B illustrates Inventive Example 3 representing a hydrogel utilizing PAM synthesized using reverse emulsion polymerization with $Zr(OH)_4$ as the nanosheet filler. FIG. 3C illustrates Inventive Example 5 representing a hydrogel utilizing PAM synthesized using reverse emulsion polymerization with non-functionalized graphene as the nanosheet filler. FIG. 3D illustrates Inventive Example 6 representing a hydrogel utilizing PAM synthesized using reverse emulsion polymerization with hexagonal boron nitride as the nanosheet filler. From the images of FIGS. 3A-3D, longer and branched chains can be observed for the neat PAM hydrogel (FIG. 3A). The PAM and nanosheet filler hydrogels (FIGS. 3B-3D) also depict long branched chain; however, the chains are more entangled. This increased entanglement indicates that the polymer and the nanosheet filler are well crosslinked which reinforces the polymer matrix. This increased entanglement is reflected in enhancement of the thermal and mechanical stability of the hydrogels.

Figure 4:
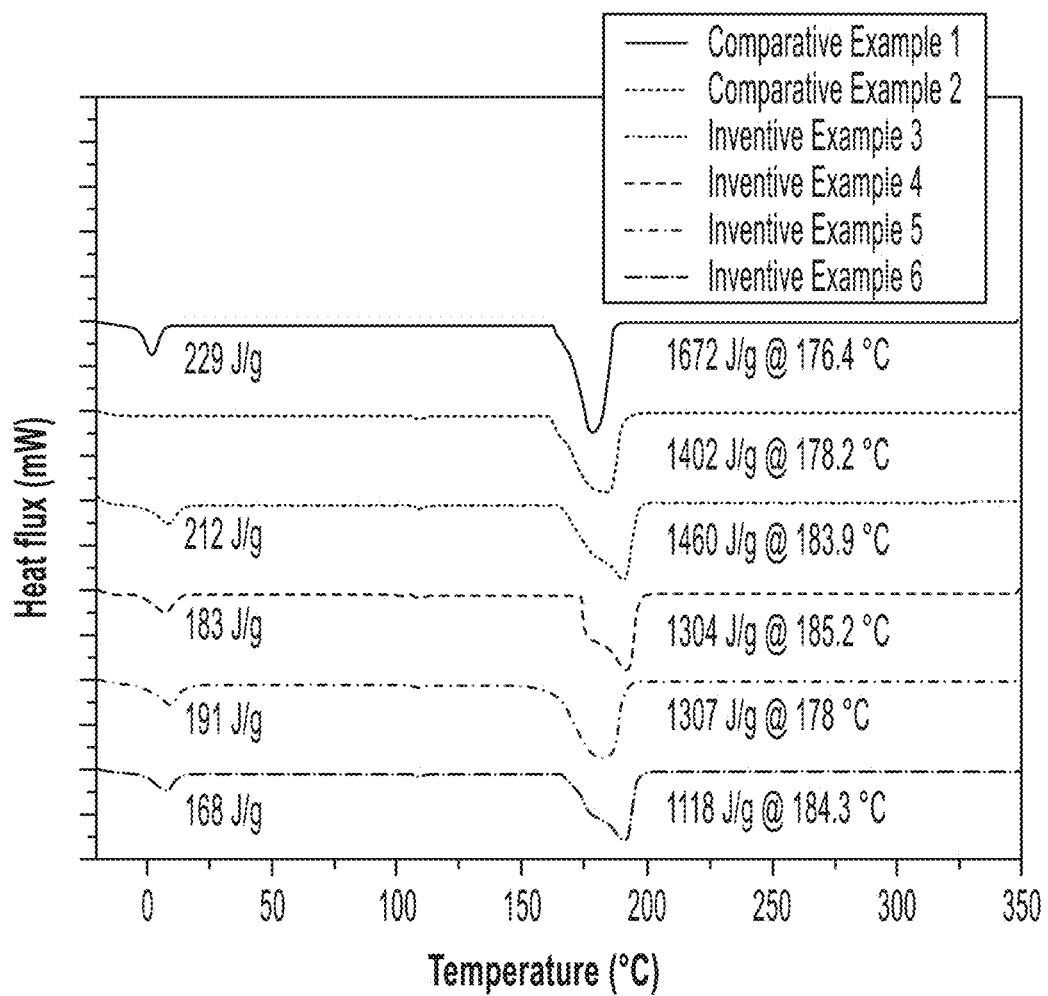
FIG. 4 is a graph illustrating Differential Scanning Calorimetry (DSC) thermograms of hydrogels and polymer composite hydrogels according to one or more embodiments described in this disclosure.

With reference to FIG. 4, Differential Scanning Calorimetry (DSC) thermograms for emulsion prepared PAM composite hydrogels with nanosheet fillers (Inventive Examples 3 through 6) and without nanosheet fillers (Comparative Example 2) are shown in comparison to commercial PAM hydrogel (Comparative Example 1). The DSC thermograms indicate the degradation temperature of neat PAM increased by 2° C. for the emulsion prepared hydrogels (Comparative Example 2) compared to commercial hydrogel (Comparative Example 1). Also, the greater amount of bound water attained by the emulsion hydrogels as indicated by the DSC thermograms suggests that more water molecules were attached directly to the surface of the polymer network. Further, more water was entrapped within the polymer matrix, thus encouraging the crosslinking of the PAM and nanosheet filler through hydrogen bonds instead of covalent bond. Such bonding is reflected in the reduced degradation enthalpies of the emulsion hydrogels (Comparative Example 2 and Inventive Examples 3 through 6) compared to commercial hydrogel (Comparative Example 1). The reduction in degradation enthalpy is indicative that less energy was required to break the newly formed bond in the emulsion hydrogels (Comparative Example 2 and Inventive Examples 3 through 6) compared to commercial PAM (Comparative Example 1).

Figure 5:
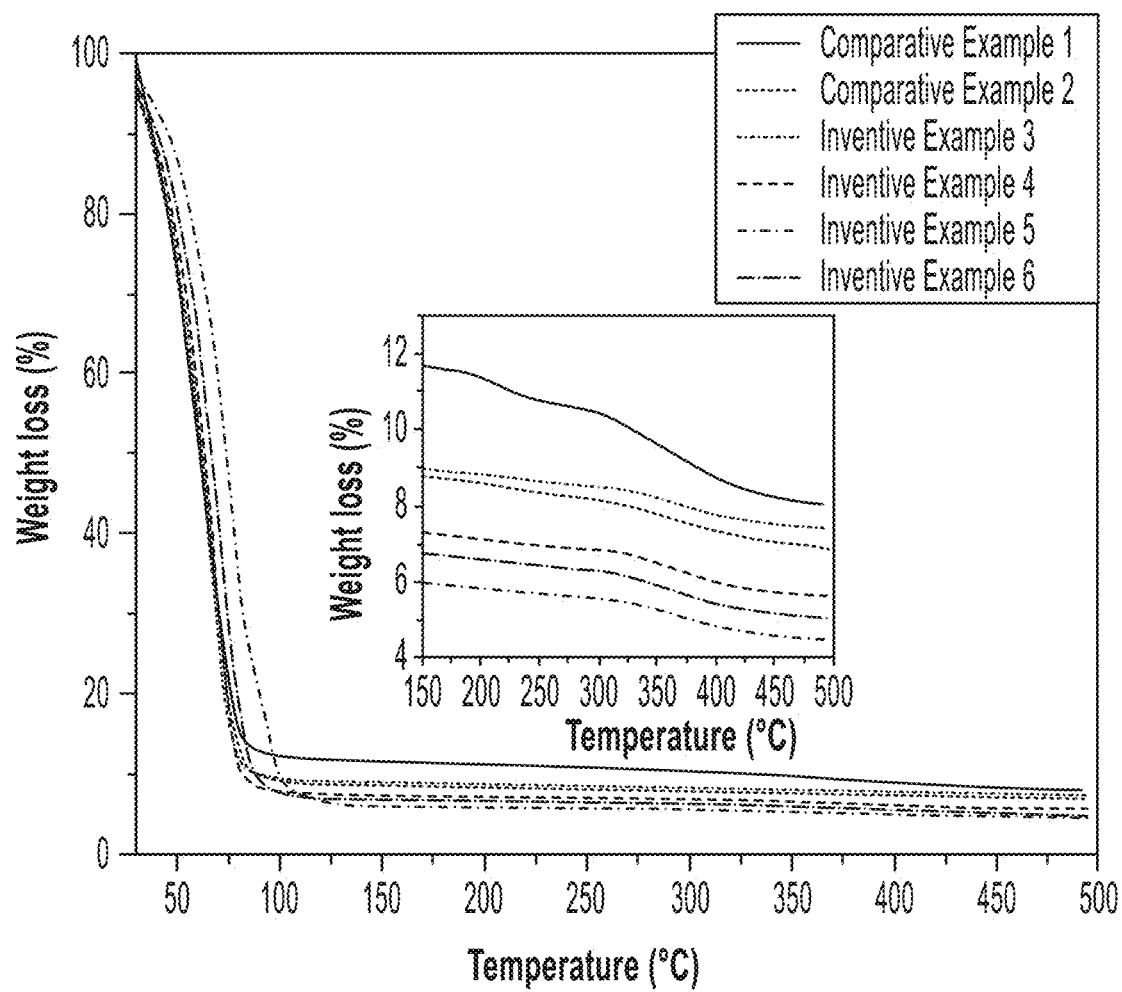
FIG. 5 is a graph illustrating thermal gravimetric analysis (TGA) thermograms of hydrogels and polymer composite hydrogels according to one or more embodiments described in this disclosure.

With reference to FIG. 5, thermal gravimetric analysis (TGA) thermograms for emulsion prepared PAM composite hydrogels with nanosheet fillers (Inventive Examples 3 through 6) and without nanosheet fillers (Comparative Example 2) are shown in comparison to commercial PAM hydrogel (Comparative Example 1). Maximum weight loss was recorded at around 100° C. due to the evaporation of water whereby the emulsion hydrogels (Comparative Example 2 and Inventive Examples 3 through 6) recorded greater water loss compared to commercial hydrogel (Comparative Example 1). This further complements the DSC thermograms whereby the emulsion polymers (Comparative Example 2 and Inventive Examples 3 through 6) have entrapped more water within their matrix. However, the emulsion hydrogels (Comparative Example 2 and Inventive Examples 3 through 6) still displayed more thermal stability compared to commercial PAM (Comparative Example 1). The greater stability is evident from the shift in the water evaporation temperature. The emulsion hydrogels of Comparative Example 2 and Inventive Examples 3 through 6 at temperature greater than 100° C. recorded less weight loss in comparison to the commercial PAM hydrogel of Comparative Example 1.

Figure 6A:
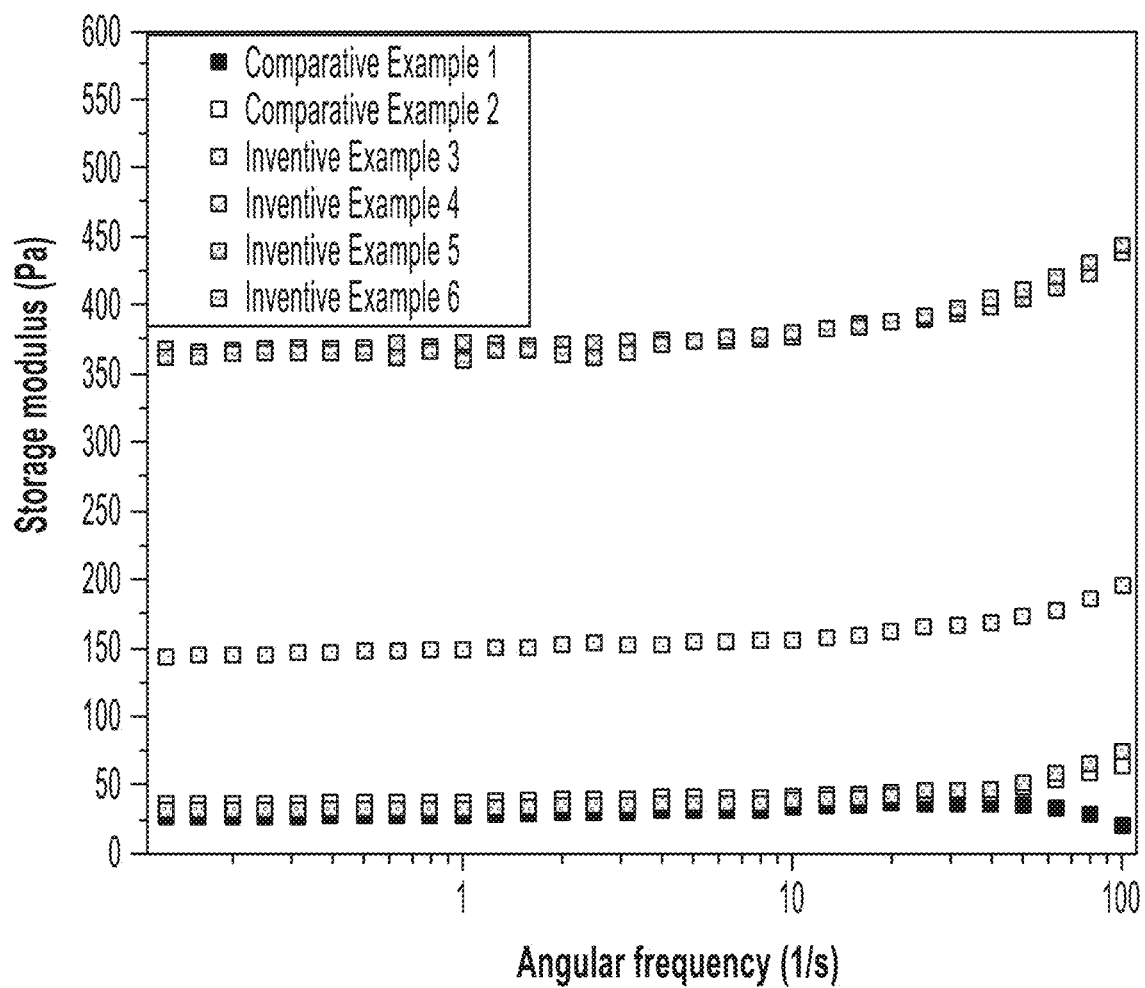
FIG. 6A is a graph illustrating storage modulus of hydrogels and polymer composite hydrogels according to one or more embodiments described in this disclosure.
Figure 6B:
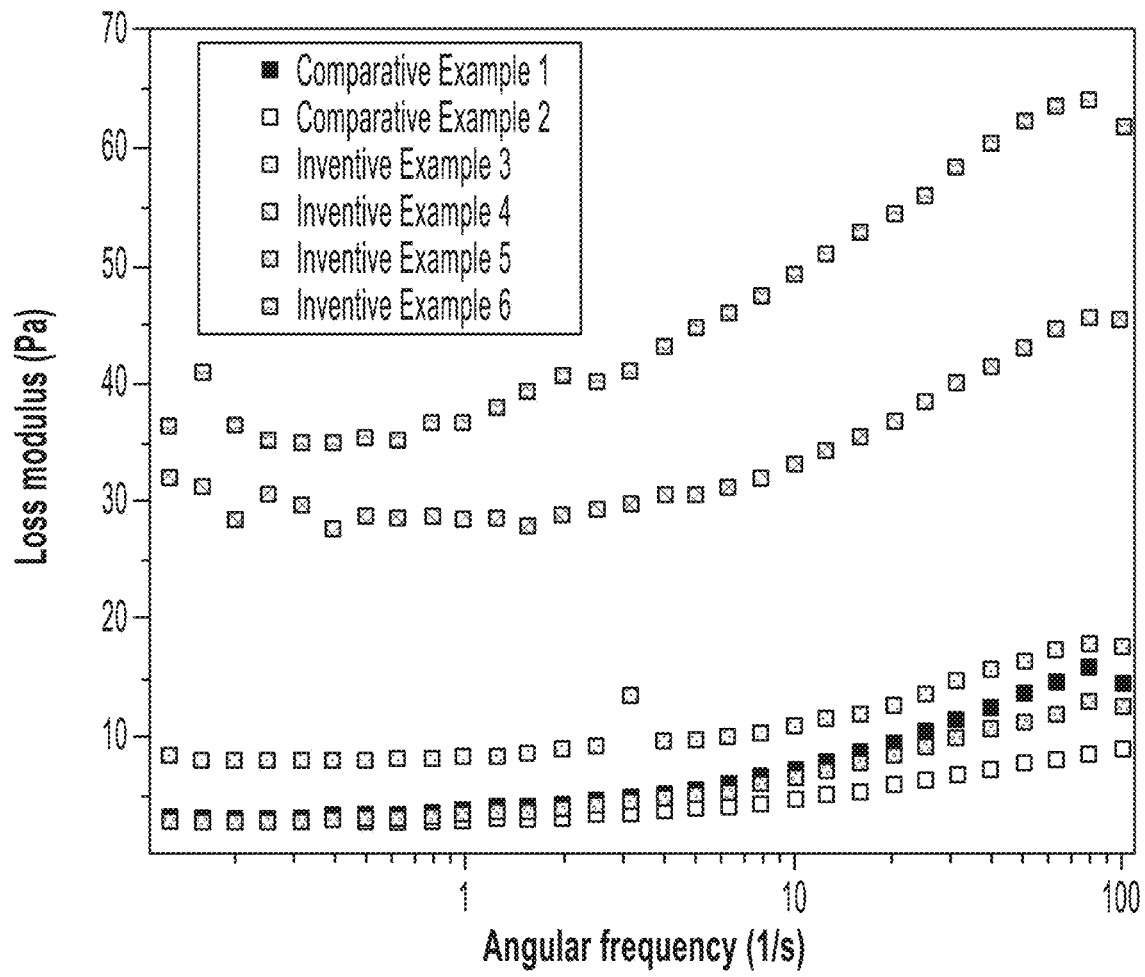
FIG. 6B is a graph illustrating loss modulus of hydrogels and polymer composite hydrogels according to one or more embodiments described in this disclosure.

With reference to FIGS. 6A and 6B, dynamic mechanical analysis (DMA) of emulsion prepared PAM composite hydrogels with nanosheet fillers (Inventive Examples 3 through 6) and without nanosheet fillers (Comparative Example 2) are shown in comparison to commercial PAM hydrogel (Comparative Example 1). Specifically, the storage modulus is illustrated in FIG. 6A and the loss modulus is illustrated in FIG. 6B. Based on the loss modulus and the storage modulus it may be inferred that the elasticity (G') and gel strength (G'/G") of the emulsion hydrogels (Comparative Example 2 and Inventive Examples 3 through 6) were greater than the commercial hydrogel (Comparative Example 1). Without wishing to be bound by theory, it is believed that the elasticity and gel strength increase is due to the strong reinforcement or entanglement of polymer network as shown in FIGS. 3A-3D.

The effect of varying the weight percentage of the organic crosslinker, the type of salt used and the pH of the solution was studied by increasing the weight percentage of the polymer composite to 4 wt %, varying the wt. % of organic crosslinker, and preparing a sample with increased pH. Specifically, Comparative Example 7 and Inventive Examples 8 through 12 include a weight percentage of the polymer composite of 4 wt %, varied wt. % of organic crosslinker (Inventive Examples 8 and 9), and a sample with increased pH (Inventive Example 12).

Figure 7:
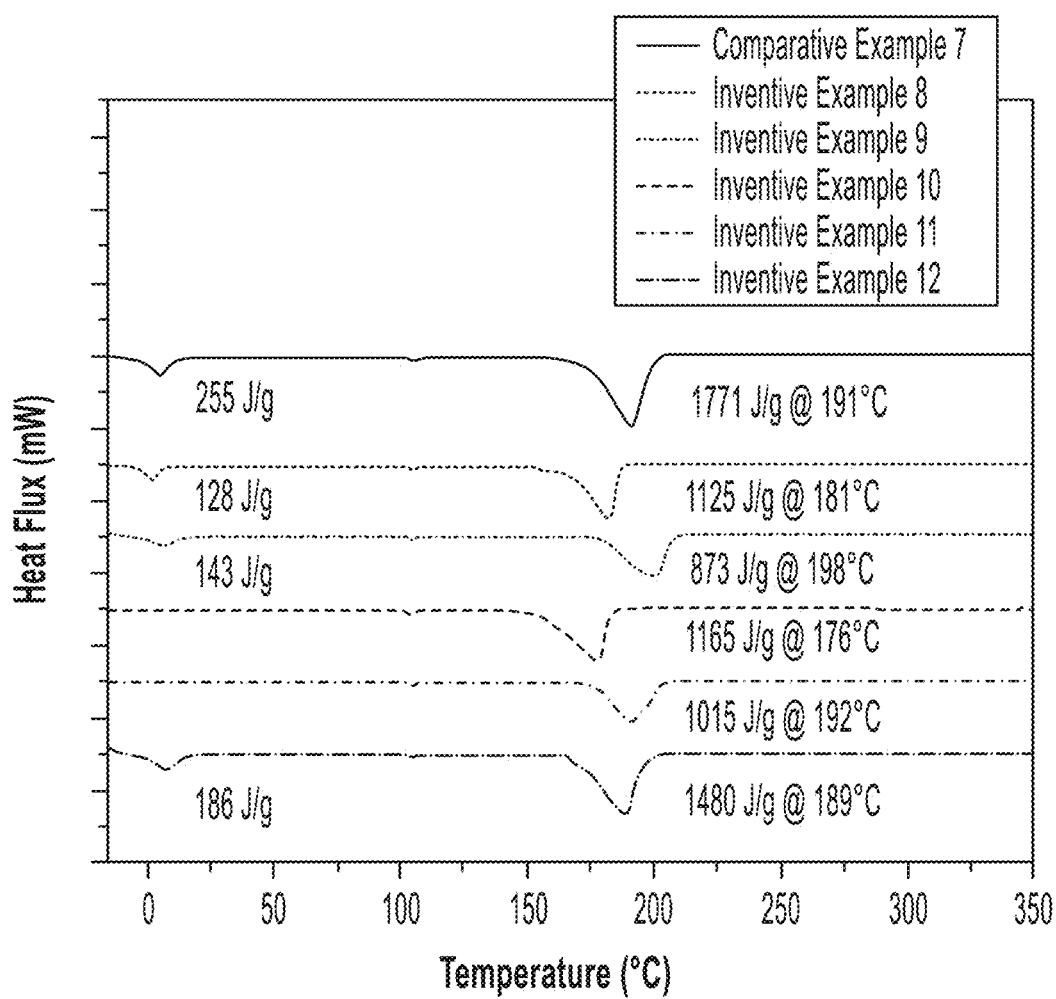
FIG. 7 is a graph illustrating DSC thermograms of hydrogels and polymer composite hydrogels according to one or more embodiments described in this disclosure.

With reference to FIG. 7, DSC thermograms of Comparative Example 7 and Inventive Examples 8 through 12 are illustrated. Based on the DSC thermograms it is understood that all the PAM composite hydrogels (Inventive Examples 8 through 12) attained less free water content and reduced degradation enthalpies compared to neat PAM hydrogel (Comparative Example 8). Further, comparison of Inventive Examples 8 and 9 which represent comparative lessening of the organic crosslinker from 0.3 wt % to 0.15 wt % demonstrated decrease in the degradation enthalpy while the amount of free water increased with the reduction in the organic crosslinker. As such it may be inferred that the PAM composite network is more weakly crosslinked with a lesser organic crosslinker wt. %, thus requiring less energy to break the bond. However, increase in free water, which also means a reduced amount of bound water, with a lesser organic crosslinker wt. %, suggests less competition between the nanosheet filler and water molecules for the interaction sites on the surface of PAM molecules. The use of different types of salts in each of Inventive Examples 8, 10, and 11 also demonstrated an effect to the free water content whereby $MgCl_2$ (Inventive Example 10) and Arabian seawater (Inventive Example 11) gave 100% bound water and the water molecules that were fully attached to the PAM surface and slightly reducing the degradation enthalpies of the hydrogels. Increasing the pH of the solution to pH 10-11 on the other hand by comparing Inventive Examples 8 and 12 demonstrated an increase in both the amount of free water and degradation enthalpy of the PAM composite hydrogel with a pH increase to 10-11. The results of free water and degradation enthalpies were confirmed with the TGA and DMA testing as provided supra.

Figure 8:
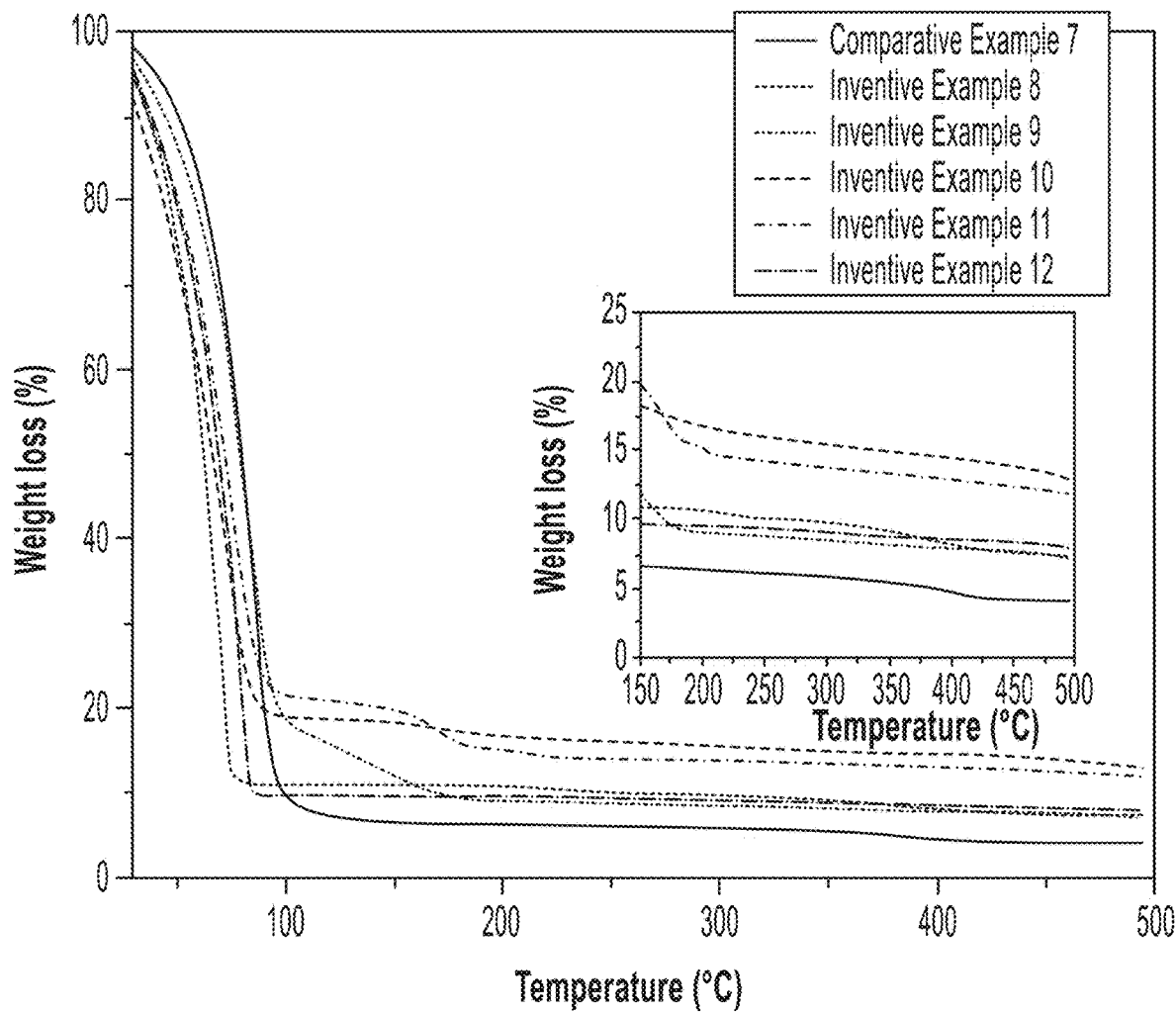
FIG. 8 is a graph illustrating TGA thermograms of hydrogels and polymer composite hydrogels according to one or more embodiments described in this disclosure.

With reference to FIG. 8, TGA thermograms of Comparative Example 7 and Inventive Examples 8 through 12 are illustrated. Maximum weight loss was recorded at around 100° C. due to the evaporation of water whereby the neat PAM hydrogel (Comparative Example 7) recorded greater water loss compared to PAM composite hydrogels (Inventive Examples 8 through 12). This further complements the DSC results whereby Inventive Examples 8 through 12 had less free water content entrapped within their matrix. At temperatures beyond 100° C., Inventive Examples 8 through 12 also recorded less weight loss in comparison to Comparative Example 7. This shows that Inventive Examples 8 through 12 were more thermally stable compared to Comparative Example 7.

Figure 9:
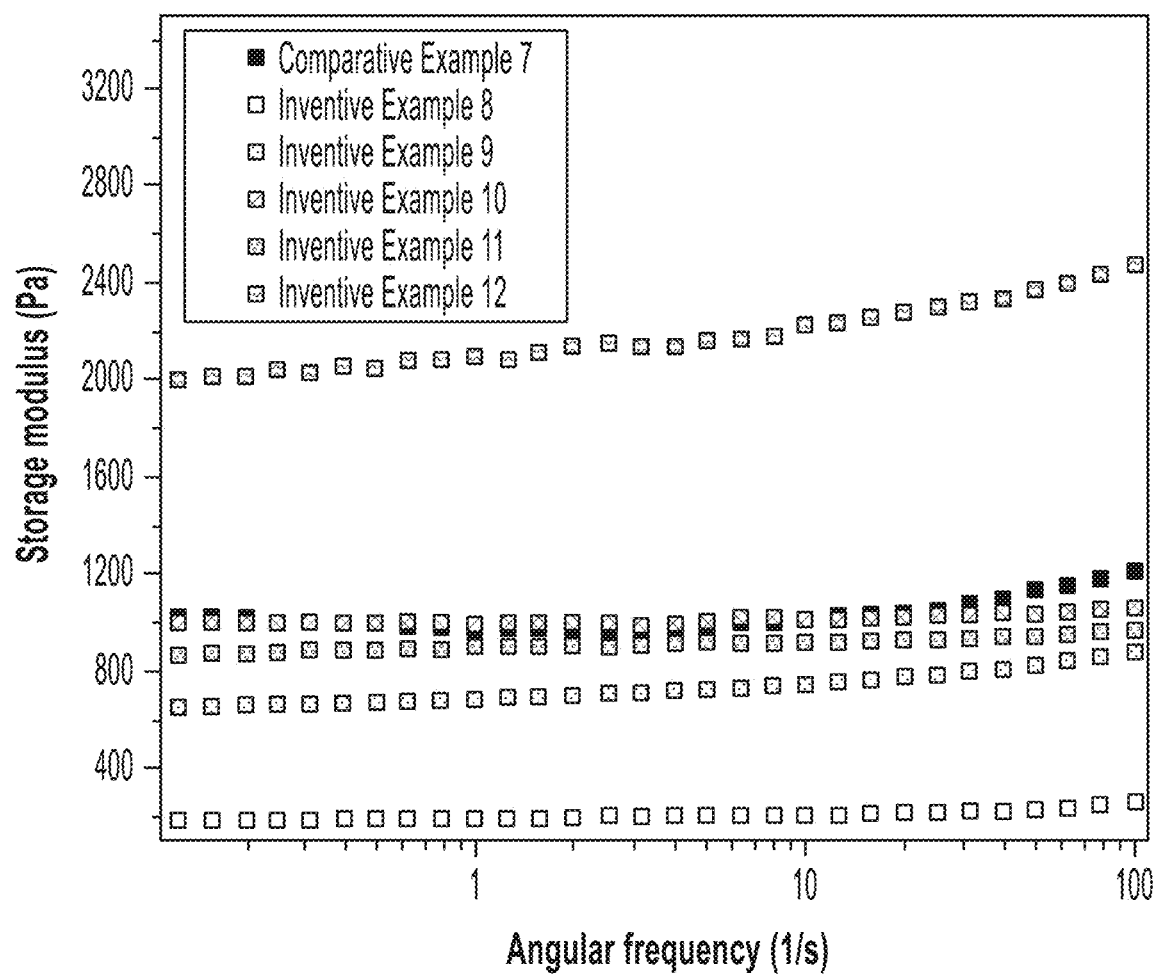
FIG. 9 is a graph illustrating storage modulus of hydrogels and polymer composite hydrogels according to one or more embodiments described in this disclosure.

With reference to FIG. 9, DMA analysis of Comparative Example 7 and Inventive Examples 8 through 12 are illustrated. In general, the elasticity (G') and gel strength (G'/G") of Inventive Examples 8 through 11 were less than for the Comparative Example 7. This is in agreement with the DSC results reported, whereby weaker hydrogen bonding as a result of less free water obtained by Inventive Examples 8 through 1 contributed in the lesser storage modulus and as a result lesser elasticity compared to Comparative Example 7. Also, lesser gel strengths obtained complement the weaker bonding formed between the nanosheet filler and PAM as evidence with lesser degradation enthalpies compared to the neat PAM hydrogel Comparative Example 7.

It should now be understood the various aspects of preparing a polymer composite, polymer composite hydrogel, and associated method of forming a barrier to shut off or reduce unwanted production of water in a subterranean formation utilizing the same are described and such aspects may be utilized in conjunction with various other aspects.

According to a first aspect, a method of preparing a polymer composite includes dispersing a nanosheet filler within a polymer matrix by dissolving a monomer in water to form a first solution, dispersing the nanosheet filler in an organic solvent in the presence of an emulsifying agent to form a second solution, combining the first solution and the second solution to form an emulsion having a weight ratio of nanosheet filler to monomer between 1:99 and 1:9, and adding a polymerization initiator comprising a persulfate to the emulsion to initiate a polymerization reaction of the monomer to form a polymer composite precursor solution. The polymer composite precursor solution comprises a polymer composite precursor within an aqueous media, the polymer composite precursor comprising the nanosheet filler dispersed in a polymer matrix of the polymerized monomer. The nanosheet filler comprises one or more of zirconium hydroxide, zirconium oxide, titanium oxide, graphene oxide, non-functionalized graphene, and hexagonal boron nitride. The method further includes quenching the polymerization reaction with the addition of a first alcohol to the polymer composite precursor solution, filtering the polymer composite precursor from the aqueous media of the polymer composite precursor solution, washing the polymer composite precursor with one or more of a second alcohol and acetone, grinding the polymer composite precursor to an average particle size of 2 to 500 nm and drying the polymer composite precursor to form the polymer composite.

A second aspect includes the method of the first aspect in which the method further comprises adding a polymerization catalyst to the emulsion in combination with the polymerization initiator.

A third aspect includes the method of the first or second aspects in which the polymerization initiator comprises APS.

A fourth aspect includes the method of the second aspect in which the polymerization catalyst comprises tetramethylenediamine.

A fifth aspect includes the method of any of the first through fourth aspects in which the monomer comprises one or more of acrylamide, acyrlonitrile acid, vinyl alcohol, ethylene terephthalic acid, butylene terephthalic acid, ethylene, isocyanates and polyols, and propylene.

A sixth aspect includes the method of the fifth aspect in which the monomer comprises acrylamide.

A seventh aspect includes the method of any of the first through sixth aspects in which the organic solvent is selected from hexane, cyclohexane, heptane, cycloheptane, toluene, and 1,2-Dichlorobenzene.

An eighth aspect includes the method of any of the first through seventh aspects in which the emulsifier agent comprises polysorbate 60, polysorbate 80, sorbitane monostearate, sorbitane monooleate, or sodium dodecyl sulfate.

A ninth aspect includes the method of any of the first through eighth aspects in which the first alcohol is selected from methanol, ethanol, iso-propanol, and propanol.

A tenth aspect includes the method of any of the first through ninth aspects in which the first alcohol is selected from methanol, ethanol, iso-propanol, and propanol.

An eleventh aspect includes the method of any of the first through tenth aspects in which the nanosheet filler comprises one or more of zirconium hydroxide, non-functionalized graphene, and hexagonal boron nitride.

According to a twelfth aspect, a method of preparing a polymer composite hydrogel for water shutoff applications includes combining the polymer composite of any of the first through eleventh aspects with water to form an aqueous solution having at least 0.5 weight percent polymer composite, adding an organic cross-linker and a salt to the aqueous solution and mixing to form a hydrogel precursor solution, and heating the hydrogel precursor solution to 150 to 175° C. for at least 8 hours to gel the hydrogel precursor solution and form the polymer composite hydrogel.

A thirteenth aspect includes the method of the twelfth aspect in which the aqueous solution comprises 0.5 to 6 weight percent polymer composite.

A fourteenth aspect includes the method of the twelfth or thirteenth aspects in which the salt is a monovalent salt, a divalent salt, or a combination of monovalent and divalent salts.

A fifteenth aspect includes the method of any of the twelfth through fourteenth aspects in which the organic cross-linker is a mixture of hydroquinone and hexamethylenetetramine.

A sixteenth aspect includes the method of any of the twelfth through fifteenth aspects in which the hydrogel precursor solution is heated to 150 to 160° C. for 40 to 56 hours.

According to a seventeenth aspect, a method of forming a barrier to shut off or reduce unwanted production of water in a subterranean formation includes injecting a polymer composite hydrogel into one or more water producing fractures in the subterranean formation, the polymer composite hydrogel comprising a nanosheet filler dispersed within a polymer matrix. The nanosheet filler comprises one or more of zirconium hydroxide, zirconium oxide, titanium oxide, graphene oxide, non-functionalized graphene, and hexagonal boron nitride. The polymer matrix comprises a polymer formed from polymerization of one or more of acrylamide, acyrlonitrile acid, vinyl alcohol, ethylene terephthalic acid, butylene terephthalic acid, ethylene, isocyanates and polyols, and propylene.

An eighteenth aspect includes the method of the seventeenth aspect in which the method further comprises preparing the polymer composite hydrogel in accordance with the twelfth aspect.

A nineteenth aspect includes the method of the eighteenth aspect in which the aqueous solution comprises 0.5 to 6 weight percent polymer composite.

A twentieth aspect includes the method of the eighteenth or nineteenth aspects in which the salt is a monovalent salt, a divalent salt, or a combination of monovalent and divalent salts.

A twenty-first aspect includes the method of any of the eighteenth through twentieth aspects in which the organic cross-linker is a mixture of hydroquinone and hex amethylenetetramine.

A twenty-second aspect includes the method of any of the eighteenth through twenty-first aspects in which the hydrogel precursor solution is heated to 150 to 160° C. for 40 to 56 hours.

A twenty-third aspect includes the method of any of the seventeenth through twenty-second aspects in which the polymer matrix comprises polyacrylamide.

A twenty-fourth aspect includes the method of any of the seventeenth through twenty-third aspects in which the nanosheet filler comprises one or more of zirconium hydroxide, non-functionalized graphene, and hexagonal boron nitride.

According to a twenty-fifth aspect, a polymer composite hydrogel is provided. The hydrogel comprising a polymer composite, water, an organic crosslinker, and a salt. Further, the polymer composite comprises a nanosheet filler dispersed throughout a polymerized polyacrylamide, the nanosheet filler comprises one or more of zirconium hydroxide, zirconium oxide, titanium oxide, graphene oxide, non-functionalized graphene, and hexagonal boron nitride, a weight ratio of the nanosheet filler to the polymerized polyacrylamide is between 1:99 and 1:9, the polymer composite hydrogel comprises 0.5 to 6 weight percent of the polymer composite, and the polymer composite hydrogel comprises 0.25 to 5 weight percent of the salt, the salt being a monovalent salt, a divalent salt, or a combination of monovalent and divalent salts.

A twenty-sixth aspect includes the polymer composite hydrogel of the twenty-fifth aspect in which the polymer composite hydrogel comprises 2 to 4 weight percent of the polymer composite.

A twenty-seventh aspect includes the polymer composite hydrogel of the twenty-fifth or twenty-sixth aspects in which the organic cross-linker is a mixture of hydroquinone and hex amethylenetetramine.

A twenty-eighth aspect includes the polymer composite hydrogel of any of the twenty-fifth through twenty-seventh aspects in which the nanosheet filler comprises one or more of zirconium hydroxide, non-functionalized graphene, and hexagonal boron nitride.

A twenty-ninth aspect includes the polymer composite hydrogel of any of the twenty-fifth through twenty-eighth aspects in which the polymer composite hydrogel comprises 0.1 to 1 weight percent of the organic cross-linker.

A thirtieth aspect includes the polymer composite hydrogel of any of the twenty-fifth through twenty-ninth aspects in which the weight ratio of the nanosheet filler to the polymerized polyacrylamide is between 1:99 and 1:25.

A thirty-first aspect includes the polymer composite hydrogel of any of the twenty-fifth through thirtieth aspects in which the nanosheet filler comprises zirconium hydroxide.

A thirty-second aspect includes the polymer composite hydrogel of any of the twenty-fifth through thirty-first aspects in which the nanosheet filler comprises zirconium oxide.

A thirty-third aspect includes the polymer composite hydrogel of any of the twenty-fifth through thirty-second aspects in which the nanosheet filler comprises graphene oxide.

A thirty-fourth aspect includes the polymer composite hydrogel of any of the twenty-fifth through thirty-third aspects in which the nanosheet filler comprises non-functionalized graphene.

A thirty-fifth aspect includes the polymer composite hydrogel of any of the twenty-fifth through thirty-fourth aspects in which the nanosheet filler comprises hexagonal boron nitride.

A thirty-sixth aspect includes the polymer composite hydrogel of any of the twenty-fifth through thirty-fifth aspects in which the salt comprises a monovalent salt.

A thirty-seventh aspect includes the polymer composite hydrogel of any of the twenty-fifth through thirty-sixth aspects in which the salt comprises a divalent salt.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

It may be noted that throughout the present disclosure an example of mixing, stirring, combining, heating, or other processing technique may be explicitly disclosed for conciseness, yet it will be appreciated that other methods of mixing, heating, and processing constituent components may also be utilized as known to those skilled in the art and such techniques are equally envisioned.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A polymer composite hydrogel, the hydrogel comprising:
    a polymer composite, water, an organic crosslinker, and a salt,
    wherein,
        the polymer composite comprises a nanosheet filler dispersed throughout a polymerized polyacrylamide;
        the nanosheet filler comprises non-functionalized graphene;
        a weight ratio of the nanosheet filler to the polymerized polyacrylamide is between 1:99 and 1:9;
        the polymer composite hydrogel comprises 0.5 to 6 weight percent of the polymer composite; and
        the polymer composite hydrogel comprises 0.25 to 5 weight percent of the salt, the salt comprising a monovalent salt.

2. The polymer composite hydrogel of claim 1, where the polymer composite hydrogel comprises 2 to 4 weight percent of the polymer composite.

3. The polymer composite hydrogel of claim 1, where the organic cross-linker is a mixture of hydroquinone and hexamethylenetetramine.

4. The polymer composite hydrogel of claim 1, where the nanosheet filler further comprises one or both of zirconium hydroxide and hexagonal boron nitride.

5. The polymer composite hydrogel of claim 1, where the polymer composite hydrogel comprises 0.1 to 1 weight percent of the organic cross-linker.

6. The polymer composite hydrogel of claim 1, where the weight ratio of the nanosheet filler to the polymerized polyacrylamide is between 1:99 and 1:25.

7. The polymer composite hydrogel of claim 1, where the nanosheet filler further comprises zirconium hydroxide.

8. The polymer composite hydrogel of claim 1, where the nanosheet filler further comprises zirconium oxide.

9. The polymer composite hydrogel of claim 1, where the nanosheet filler further comprises graphene oxide.

10. The polymer composite hydrogel of claim 1, where the nanosheet filler further comprises hexagonal boron nitride.

11. The polymer composite hydrogel of claim 1, where the salt further comprises a divalent salt.

12. The polymer composite hydrogel of claim 1, where the nanosheet filler has a particle size of 5 to 25 microns.

13. The polymer composite hydrogel of claim 1, where the nanosheet filler has a thickness of 1 to 10 nm.

14. The polymer composite hydrogel of claim 1, where the nanosheet filler has a particle size of 5 to 25 microns and a thickness of 1 to 10 nm.

* * * * *